(12) United States Patent
Lloyd et al.

(10) Patent No.: US 10,894,209 B2
(45) Date of Patent: Jan. 19, 2021

(54) SYSTEM AND METHOD OF PROVIDING A GAME

(71) Applicant: BQ MEDIA LAB PTY LTD, Melbourne (AU)

(72) Inventors: Benjamin Christopher Lloyd, Melbourne (AU); Dipnarayan Guha, Melbourne (AU)

(73) Assignee: BQ Media Lab Pty Ltd, Glen Waverley (AU)

( * ) Notice: Subject to any disclaimer, the term of this patent is extended or adjusted under 35 U.S.C. 154(b) by 0 days.

(21) Appl. No.: 16/306,633

(22) PCT Filed: Jun. 2, 2017

(86) PCT No.: PCT/AU2017/050537
§ 371 (c)(1),
(2) Date: Dec. 3, 2018

(87) PCT Pub. No.: WO2017/205934
PCT Pub. Date: Dec. 7, 2017

(65) Prior Publication Data
US 2019/0308098 A1    Oct. 10, 2019

(30) Foreign Application Priority Data

Jun. 2, 2016 (AU) .............................. 2016902128

(51) Int. Cl.
*A63F 13/34* (2014.01)
*A63F 13/48* (2014.01)

(52) U.S. Cl.
CPC .............. *A63F 13/34* (2014.09); *A63F 13/48* (2014.09)

(58) Field of Classification Search
CPC .......... A63F 13/12; A63F 13/31; A63F 13/34; A63F 13/48
USPC ........................................................... 463/42
See application file for complete search history.

(56) References Cited

U.S. PATENT DOCUMENTS

| 8,043,159 B2 * | 10/2011 | Bae ..................... G07F 17/3223 463/32 |
| 2004/0203378 A1 * | 10/2004 | Powers ................. H04W 88/04 455/41.2 |
| 2007/0018952 A1 * | 1/2007 | Arseneau ............... H04H 40/27 345/156 |

(Continued)

FOREIGN PATENT DOCUMENTS

WO    WO 2005/022397 A1    3/2005

OTHER PUBLICATIONS

PCT International Search Report and Written Opinion, PCT/AU2017/050537, dated Aug. 16, 2017, 10 Pages.

(Continued)

*Primary Examiner* — Michael A Cuff
(74) *Attorney, Agent, or Firm* — Fenwick & West LLP

(57) ABSTRACT

The disclosure relates to a system and a method of providing a game over a peer to peer network. The disclosure provides a method of providing a game over a peer to peer (P2P) game network, wherein the P2P game network comprises a plurality of user devices as the nodes of the network. The P2P game network is arranged to generate or process game data on a subset of the user devices of the game network in response to a user device not being a member of the subset user devices, generating a game data request to play a game.

38 Claims, 9 Drawing Sheets

(56) References Cited

U.S. PATENT DOCUMENTS

| | | | | |
|---|---|---|---|---|
| 2008/0222250 | A1* | 9/2008 | Datta | H04L 29/06 709/204 |
| 2009/0247303 | A1* | 10/2009 | Yamaguchi | A63F 13/12 463/42 |
| 2009/0318219 | A1* | 12/2009 | Koustas | G07F 17/32 463/23 |
| 2010/0062857 | A1* | 3/2010 | Kert | A63F 13/12 463/42 |
| 2011/0190063 | A1* | 8/2011 | Kajii | A63F 13/795 463/42 |
| 2011/0252079 | A1* | 10/2011 | Werner | H04L 29/125 709/202 |
| 2012/0064968 | A1* | 3/2012 | Youm | A63F 13/335 463/29 |
| 2013/0072296 | A1* | 3/2013 | Miyazaki | A63F 13/10 463/31 |
| 2013/0143666 | A1 | 6/2013 | Osako | |
| 2016/0091974 | A1* | 3/2016 | Fuke | G06F 3/017 345/156 |

OTHER PUBLICATIONS

Kosmopoulos, A., et al., "Fueling Game Development in Mobile P2P Environments," The 18$^{th}$ Annual IEEE International Symposium on Personal, Indoor and Mobile Radio Communications (PIMRC '07), 2007, Athens, Greece.

Mitchell, K., et al., "Six in the City: Introducing Real Tournament—a Mobile IPv6 Based Context-Aware Multiplayer Game," ResearchGate, Conference Paper, Jan. 2003, retrieved from the Internet on Aug. 10, 2017, retrieved from <URL: https://www.researchgate.net/profile/Stefan_Schmid8/publication/221391456_Six_in_the_city_introducing_Real_Tournament_-_a_mobile_IPv6_based_context-aware_multiplayer_game/links/02bfe511d00b5b5a98000000.pdf>.

Wu, Z. D., "Performance Modelling of Multicast Groups for Multiplayer Games in Peer-to-Peer Networks," Information Technology Papers, Bond Business School, Jul. 2005, retrieved from the Internet on Aug. 7, 2017, retrieved from <URL: http://epublications.bond.edu.au/infotech_pubs/22>.

* cited by examiner

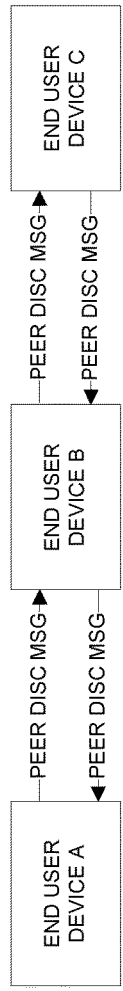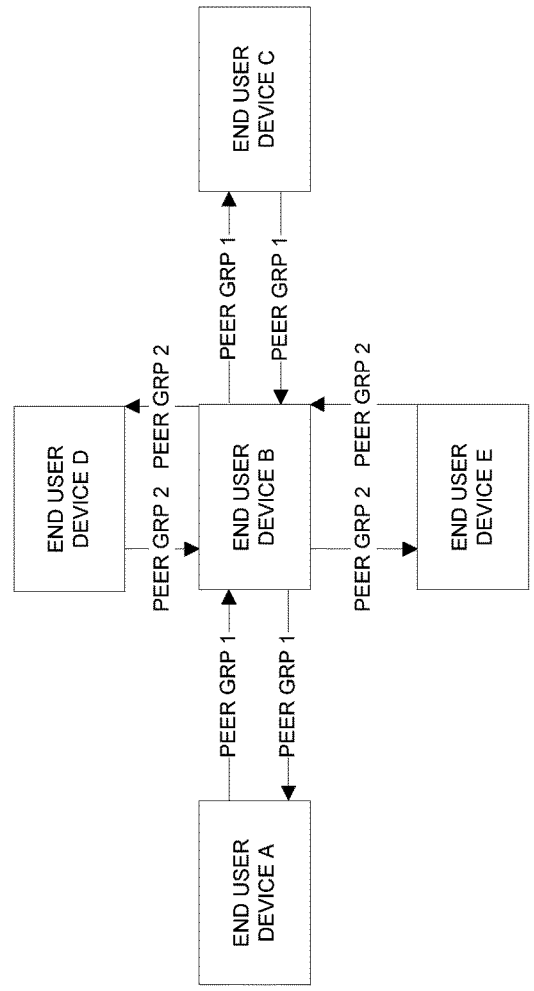
FIG. 9 (a)
FIG. 9 (b)
FIG. 9 (c)

SYSTEM AND METHOD OF PROVIDING A GAME

FIELD OF THE INVENTION

The disclosure relates to a system and a method of providing a game over a peer to peer network.

BACKGROUND TO THE INVENTION

Many game applications require a random number or a similar random game element to be used as the game input. For example, game of chance, such as lotteries, scratchies, poker machines or the like all use one or more random numbers or graphic elements as the input of a game. By 'game of chance' it is generally meant a game whose outcome is determined by the correlation between game input generated by a randomizing component, which may be a hardware and/or a software component, and the game input decided by a user. Commonly used randomizing hardware component may include dice, spinning tops, ball drawing machine, roulette wheels or the like. While people have been using these hardware randomizing components for many years, it has been challenging to program a computer or other similar electronic devices to generate a true random number. Machines follow algorithms, which, over time, are repeated in pattern, creating pseudo-randomisation instead of true randomisation.

Nowadays, some games of chance are implemented using computer systems. The random game input required for a game (e.g. lotto numbers) is often generated by a central server, or locally generated on user devices (e.g. mobile phones, tablet devices) owned by participants of the games. In a system that employs a central server or singularity based host machines, all game states or outcomes are dependent on the output of one or a series of centrally controlled machines. For central server based systems, the cost of infrastructure and maintenance becomes significant as the number of system users increases. If the central server fails or malfunctions, the entire game system will be down. On another hand, if a user device is programmed to generate game input data, then there may be an opportunity for fraudulent activity. For example a user device may be programmed to generate game input that is only favourable to selected players.

Finally, traditional game of chance typically requires a bet, wager or quantifiable transaction which the player has to exchange to play the game. Thus the cost of playing or the risk of losing a player's stake may discourage potential players from using such system. Players of these games may become addicted or end up spending a large amount of money on such activities.

SUMMARY OF THE INVENTION

It is an object of the disclosure to provide a method for providing a game, a system for playing a game, system components and a game that addresses at least some of the issues mentioned above, or to at least provide an alternative choice for the public.

In a first aspect, the disclosure provides a method of providing a game over a peer to peer (P2P) game network, wherein the P2P game network comprises a plurality of user devices as the nodes of the network, said P2P game network being arranged to generate or process game data on a subset of the user devices of the game network in response to a user device not being a member of the subset user devices, generating a game data request to play a game.

In a second aspect, the disclosure provides a method of providing a game over a peer to peer (P2P) game network, wherein the P2P game network comprises a plurality of user devices as the nodes of the network, said P2P game network being arranged to generate or process game data required by the user devices of the P2P game network to play a game.

In one form, the method comprises the steps of:
  receiving a game request from a first user device of the P2P game network,
  processing the game request received to decide game data required by the game request,
  generating the requested game data on the P2P network, and
  providing the game data to the first user device that sent the game request.

In one form, the step of receiving a game request comprises:
  receiving the game request on a subset user devices of the P2P game network, wherein the subset user devices do not include the first user device that sent the game request.

In one form, the first user device and the subset user devices form a subnetwork of the overall P2P game network, wherein the subnetwork is also a P2P network.

In one form, the data exchange between the devices of the subnetwork is in the form of protocol messages.

In one form, the requested game data is distributively generated by the subset user devices of the P2P network. In another form, the requested game data is generated on each one of the subset user devices. In one form, the method further comprises, before the step of receiving a game request from a first user device of the P2P game network, generating a first set of game data on the first user device based on one or more sensor outputs of the user device.

In a preferred form, the step of generating a first set of game data on the first user device comprises:
  retrieving or reading an output of the one or more sensors of the user device,
  generating the first set of game data based on sensor outputs in a data format suitable for the game selected by the user.

In one form, the game request comprises data indicative of the first set of game data generated on the first user device.

In one form, the game request also comprises data indicative of the game chosen by the first user.

In one form, the game request comprises one or more data indicative of the first set of game data and/or the game chosen by the first user.

In one form, the method further comprises:
  encapsulating the game request before sending it to the subset user devices of the P2P game network.

In one form, the step of generating the requested game data on the P2P network comprises:
  analysing the game request received to determine the first set of game data already generated by the first user device and a second set of game data required for completion of the selected game,
  generating the second set of game data required on the P2P network based on the game request.

In one form, the one or more sensors may include one or more of the following sensors: temperature sensor, light sensor, sound sensor, pressure sensor, gesture sensor, accelerometer, gyroscope, magnetometer, proximity sensor, heart rate sensor, fingerprint sensor, UV light sensor, and any other sensor that a user device may be equipped with.

In one configuration, the one or more sensors include a temperature sensor for measuring ambient temperature, or measuring temperatures of various hardware components such as the CPU, GPU, hard drive or motherboard of the programmable user device.

In one form, the data format is a format that comprises a series of single digits 0 to 9.

In another form, the data format may be a format that comprises one or more of graphic element, word elements, sound element or any other suitable game elements.

In one form, after retrieving or reading an output of the one or more sensors of the user device, the method further comprises:
 splitting the numerical value of the one or more sensor output to a series of single digits 0 to 9; and/or
 combining or arranging one or more single digits of the numerical value to form numbers that have a predefined length; and/or
 referencing the numerical value of the output or one or more single digits of the numerical value against a reference library to convert the numerical value to one or more graphic elements.

In one form, the step of generating the second set of game data on the P2P network comprises: based on the game request, performing a series of combinatorial functions on the first set of data.

In one form, the step of generating the second set of game data on the P2P network comprises: based on the game request, performing a series of combinatorial functions on the first set of data.

In one form, the method further comprises encrypting the second set of game data generated by the subset devices, and decrypting the second set of game data on the first user device upon receiving such data from the subset user devices.

In one form, the method further comprises:
 after receiving the requested second set of game data on the first user device,
 assessing the game data against a set of winning conditions,
 determining a game result,
 displaying the game result to the user on a display of the user device.

In another form, the method may include:
 providing the first and the second set of game data to a server,
 assessing the game data against a set of winning conditions on the server,
 determining a game result, and
 providing the game result to the user device requested the game data.

In one form, the set of winning conditions may include a lookup table of predefined sequences of game elements such as digits or numbers, graphic elements, icons, words and similar thereof.

In another form, the step of assessing the game data against a set of winning conditions may include comparing the first and the second set of game data, and the winning condition is determined based on the correlation or similarity of the two sets of data.

In one form, the game result is associated with a prize. The prize can include, e.g. a monetary or other types of rewards associated with the game data received on the first user device.

In one form, the server is a remotely located cloud server.

In one form, the method further includes:
 displaying advertising content on a display of the one or more user devices of the P2P game network.

In one form, the method further includes:
 transmitting advertising content from the server to the one or more devices of the P2P network.

In a third aspect, the disclosure provides a method of playing a game on a first user device, the method comprising the steps of:
 generating a game request on the first user device, wherein the game request is indicative of a request for game data,
 providing the game request to a game network, wherein the first user device is part of the game network, said game network comprises a plurality of user devices arranged to generate game data after receiving the game request from the first user device,
 receiving requested game data on the first user device.

In one form, the game network is a peer-to-peer network (herein: P2P) wherein the plurality of user devices are the nodes of the P2P network.

In one form, the step of providing the game request to the game network comprises:
 providing the game request to a subset of the one or more user devices of the game network, wherein the subset user devices are selected from the game network based on a set of predetermined rules, and the first user device and the subset user devices form a subnetwork of the overall P2P game network during game play.

In one form, the subnetwork is established and maintained by exchanging protocol messages between devices of the subnetwork.

In one form, the game request is indicative of the type of game selected by a user and the data required from the game network for completion of a game.

In one form, the P2P network is a structured or a predefined network.

In another form, the P2P network is a hybrid P2P or an unstructured network.

In one form, the method further comprises:
 after receiving the requested game data by the first user device,
 assessing the game data against a set of winning conditions,
 determining a game result,
 displaying the game result to the user on a display of the user device.

In another form, the method may include:
 transmitting the game data to a server,
 assessing the game data against a set of winning conditions on the server,
 receiving and displaying the game result on the user device.

In one form, the set of winning conditions may include a lookup table of predefined sequences of game elements such as digits or numbers, graphic elements, icons, words and similar thereof.

In one form, the game result is associated with a prize, wherein the prize can include cash or other types of rewards associated with the game data received on the user device.

In one form, the server is a remotely located cloud server.

In one form, the method further includes:
 displaying advertising content on a display of the one or more user devices of the P2P game network.

In one form, the method further includes:
receiving advertising content transmitted from the server on one or more devices of the P2P network.

In a fourth aspect, the disclosure provides a programmable user device having a processor or processors that are configured to execute computer-readable instructions to execute the method of the first, second or the third aspect of the disclosure.

In one form, the programmable user device may further comprise:
input means for enabling a user to play a game,
a communication module that is operable to form a data communication link with devices of the game network,
a central processing unit for processing game data,
a user display for displaying relevant game information to the user.

In one form, the user device may be a portable electronic device, such as a smartphone, tablet, tablet computer, laptop, or PDA.

In a fifth aspect, the disclosure broadly consists in a computer-readable medium having stored thereon computer executable instructions that, when executed on a processing device or devices, cause the processing device to perform the method of the first, the second or the third aspect of the disclosure.

In one form, the computer executable instructions are in the form of a user application and more specifically a smartphone application or a tablet device application downloadable from an application store such as Google Store, Apple App Store, or from other application sources.

In one form, the user application comprises:
a native application generally developed for use on a user device, and
a software stack supporting the operation of the native application.

In alternative embodiments, the native application may instead be provided as a web application, or as a hybrid application.

In one form, the software stack comprise a plurality of customized application modules and one or more network modules.

In one form, the software stack may include: a random number generator module, an input data processing module, a game selector module, a permutation module, a matching module, a discovery module, and a linking module.

In a sixth aspect, the disclosure provides a method of playing a game on a first user device, the user device being a node of a P2P game network comprising a plurality of user devices, the method comprising:
on the first user device:
generating a game request, wherein the game request comprises a request for game data,
providing the game request to a subset of the user devices of the P2P game network, on the game network:
receiving the game request,
processing the game request received to decide additional game data required by the game request,
generating the requested game data on a subset of user devices, and
providing the game data to the user device that requested the game data and/or to a server,
on the first user device,
generating and displaying a game result.

In a seventh aspect, the disclosure provides a method of playing a game of chance including:
defining a base game of chance including;
awarding a prize corresponding to at least one winning outcome of the game, wherein the value of said prize is related to a value of a player's stake;
a corresponding apparent probability of achieving each winning outcome, based on [a set of game rules/a nature of the game].

In one form, the method further including:
receiving from a player a selected prize, having a nominal value;
modifying the base game of chance based on a relative value of:
the player's interaction with an advertising content associated with playing said game; and
a stake corresponding to prize having said nominal value as defined by the base game.

Preferably modifying the base game of chance includes determining a modified probability of achieving each winning outcome, based on the relative values. For example this can include scaling the apparent probability to account for the relative values.

As used herein, except where the context requires otherwise the term 'comprise' and variations of the term, such as 'comprising', 'comprises' and 'comprised', are not intended to exclude other additives, components, integers or steps.

As used herein the term "and/or" means "and" or "or", or both.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF DESCRIPTION OF THE DRAWINGS

Embodiments of the disclosure will be described by way of example only and with reference to the accompanying drawings. In the drawings:

FIG. 9 shows an example of realization of the p2p network using protocol messaging exchanges.

DETAILED DESCRIPTION OF PREFERRED EMBODIMENTS

In the following description, specific details are given to provide a thorough understanding of the embodiments.

However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of user device or a mobile device. The term "user device" includes, but is not limited to, a wireless device, a mobile phone, a mobile communication device, a smart phone, a user communication device, personal digital assistant (PDA), mobile hand-held computer, a tablet computer, a laptop computer, an electronic book reader and reading devices capable of reading electronic contents and/or other types of mobile devices typically used by individuals and/or having some form of communication capabilities (e.g., wireless, wired, infrared, short-range radio, etc.).

Overview

Figure 1:
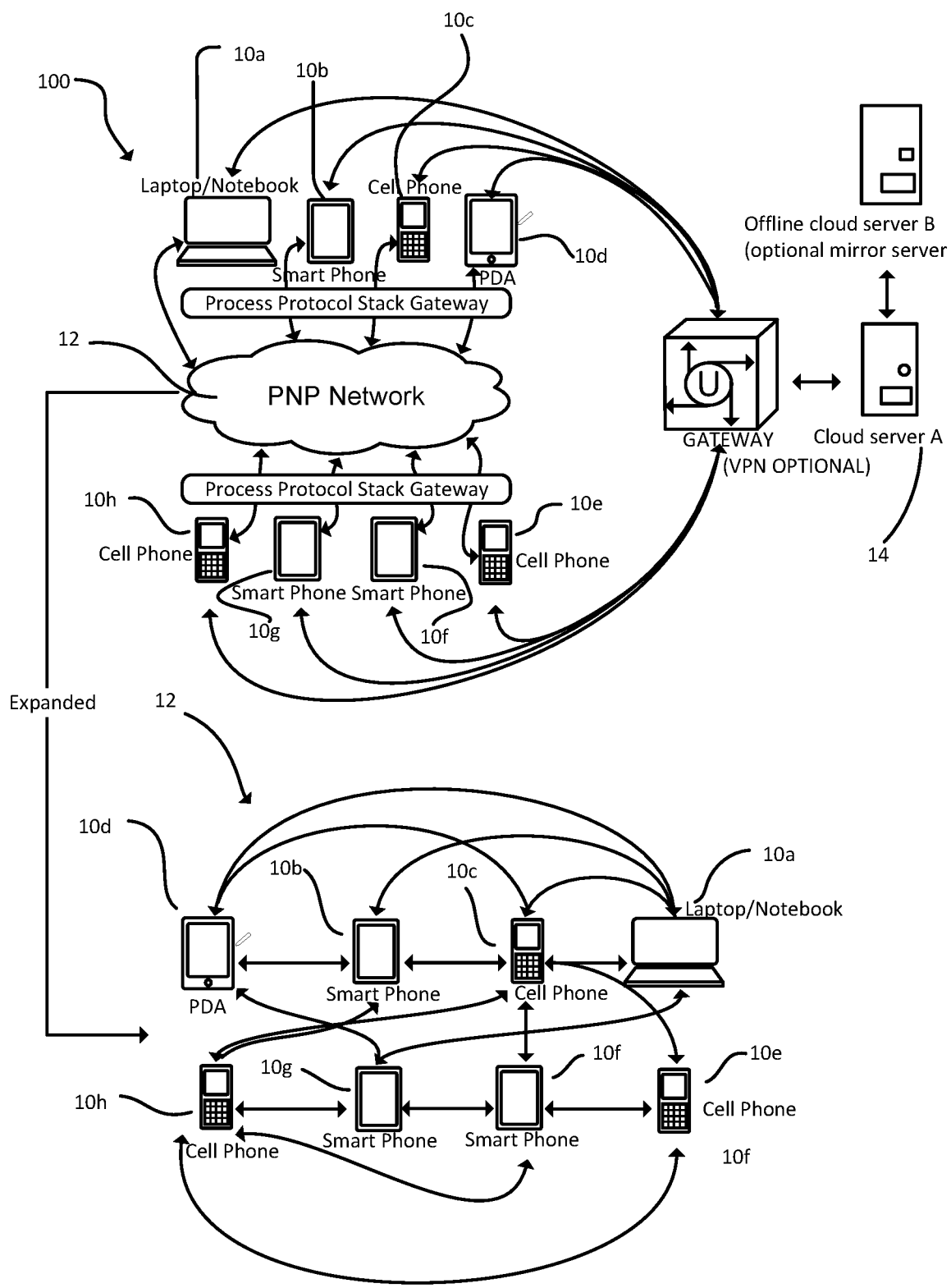
FIG. 1 is a schematic block diagram giving an overview of a system in accordance with an exemplary embodiment of the disclosure.

A system of an embodiment of the disclosure can generally be implemented in a gaming environment shown in FIG. 1. The gaming environment, involves a plurality of game players each playing a game on their corresponding user device 10a, 10b, 10c, 10d, 10e, 10f, 10g, 10h, either individually or jointly as a group. The general system architecture may be said to broadly comprise at least a user application configured to run on the user devices 10a . . . 10h of a P2P network 12, in which the user devices 10a . . . 10h are the nodes of the P2P network 12. The user application facilitates game play via user interacting with one or more interfaces of the user application. In one form, the user application provides one or more leisure games, such as scratchy, lotto, or any other games suitable to be played on a portable user device. The user application also manages the operation of the P2P network and the data communication between the user devices of the P2P network. In an exemplary embodiment, the user application is provided as a smart device application accessible from an app market such as that provided by Google, Apple, Microsoft or other sources. The user downloads and installs the application on a selected user device such as a smartphone, tablet device or any other suitable electronic devices as mentioned above.

In addition, the system may also be used as marketing and advertising tool for businesses by displaying advertising information to users of the system within the user application. Advertising and marketing information may be displayed to the user before, during, or after the user plays a game. The marketing and advertising information may be displayed as banners, pop-up screens, or in any other suitable format.

After a user starts the user application, he or she is arranged to select a game via operating a user interface of the application. The user may be asked to enter some input for the game selected, or the user application may automatically generates some input based on what the user has selected. In accordance with the disclosure, at least some of the game data required for a game result to be calculated is generated on a subset of peer user devices 10a . . . 10h of the P2P network 12, after the subset peer devices receive a game request from the first user device. In one form, the user application is arranged to generate a first set of game data based on one or more sensor outputs of the first user device (on which the user application is running to play a game), and based on the data generated, generate and provide a game request to the P2P network to request additional game data for completion of the game being selected. The game request may include game data. It will be appreciated that the overall P2P network may comprise a plurality of sub-networks, wherein each subnetwork is established and maintained by exchanging protocol messages. The rest of the game data required for completion of the game is generated on the subset peer devices after a series of data manipulation steps of the game request received. In another form, all of the game data required for a game result to be calculated is generated by subset of peer devices of the game network after a first user sends a game play request generally indicative of which game the user has selected to play and what data is required for generating a game outcome.

Once the user application receives the additional game data generated by the subset peer devices of the P2P network, the game data is analysed by the user application and instantly a game result (e.g. win/loss) is displayed on a screen of the user device. In case of a loss, the user can play another round of the same game or a different game subsequently at any time. In case of a win, the user is notified of an award or a prize in the form of a monetary prize or other forms of prizes.

In one form, the award or the prize offered to the winner of a game is determined based on a profit formula. In one form, the award or the prize won by the user for each game is determined based on the total number of players in the system and the advertising revenue or profit received from businesses over a selected period.

The system architecture may also comprise a server application residing on a server 14. The server may be a central server or a cloud server. The system is designed so that the user application has minimal level of interaction with the server application when the user plays a game. The server application does not generate any game related data for users of the P2P network. All the game data is generated by user devices of the P2P network, which means the server application cannot alter, adjust or impact the outcome of any game. The server application may be arranged to manage user profiles, calculate prizes or awards, manage advertising content displayed to users, configure user application updates, and so on.

User Application

Figure 2:
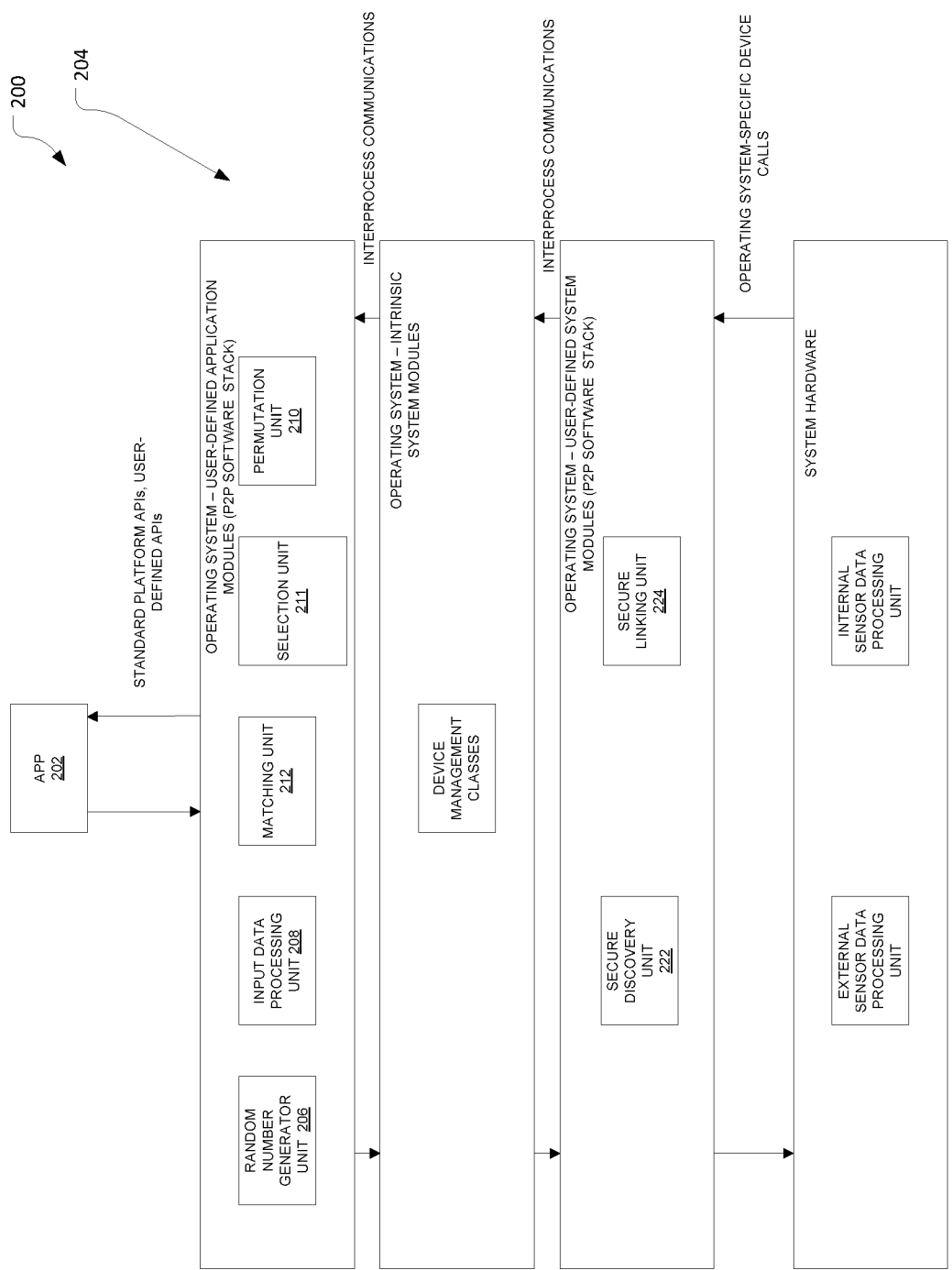
FIG. 2 is a schematic diagram of a user device application for executing on a user device in accordance with an embodiment of the disclosure.

FIG. 2 is a schematic diagram of a user device application 200 for executing on a user device in accordance with an embodiment of the disclosure. For ease of explanation, the user device application has been divided into various functional modules. In the exemplary embodiment shown in FIG. 2, the user application 200 generally comprises two main components: a native application 202, and a customizable P2P software stack 204 supporting the operation of the native application. In other alternative embodiments, the native application may instead be provided as a web application, or as a hybrid application. The native application 202 (native app) is an application program that is generally developed for use on a particular platform or device, and interfaces with standard platform APIs and user-defined APIs with the user device operating system. The software stack 204 or also known as the solution stack is a set of software subsystems or components needed to create a complete platform to support the operation of the native app.

With reference to FIG. 2, the software stack 204 may comprise at least a plurality of customized application modules and one or more network modules. The application modules may include at least a random number generator module 206, an input data processing module 208, a game selector module 211a, a permutation module 210, and a matching module 212. The network modules may include at least a discovery module 222 and a linking module 224. The various modules of the user application cooperate with other software or hardware components of the user device to support the user application and more specifically generate game data as required by users of the P2P network.

According to the disclosure, the random number generator module 206 generates game data required as input to a user selected game based on one or more user device sensor outputs. In one form, the random number generator module 206 receives sensor data indicative of the user device and/or device ambient conditions measured by sensor components of the user device, and encapsulates or modulates the sensor data for additional security. This encapsulated or modulated sensor data is then used as the source data for the first set of game data generated on the first user device. The sensor data may be subjected to a series of data manipulation steps to be converted to a format suitable to be used by the random number generator. The data manipulation steps may be performed by the random number generator module 206, and/or by the input data processing module 208.

The input data processing module 208 performs further processing of the data received from the random number generator module 206, and then transmits the data generated on the first user device 10a as part of a game request to subset peer devices 10b, 10c, 10d, 10e, 10f, 10g, 10h of the P2P network 12, to generate the additional data required for completion of the game.

The output of the random number generator module 206 may also be received or monitored by a game selector module 211, which enables a user to select a game to play. In one embodiment, the game selector module may only allow a user to select a game to play after the random number generator module 206 has finished generating a first set of game input data. For example, after the user starts the user application, the random number generator module immediately generates a set of game data by retrieving sensor component readings, and then notifies the game selector module 211 that the user can now select a game to play. In one form, the user application comprises a game library which includes all the games that a game participant is enabled to play. After a user selects a game to play via operating the user interface, the game selector module references the game library, and generates data indicative of the type of the game picked by the participant. Preferably, the output of the game selector module 211 is also encapsulated or modulated by the random number generator module before it is transmitted to the P2P network as part of a game request.

As mentioned, the game data generated by the random number generator module 206 (e.g. first set of game data), is processed as part of a game request, and subsequently processed on subset peer user devices of the P2P network 12 to generate additional game data as required by the game. The module that performs this step on each of the subset user devices is the permutation module 210. The permutation module 210 receives the game request including data indicative of what has already been generated by the input data processing module 208 and the game selector module 211 of the first user device 10a. The permutation module 210 of each user device in the subset of peer user devices 10b . . . 10h interprets game request received, to decide which game the user has selected to play, and what additional data is required so a game result can be determined. The permutation module 210 then produces the additional game data required, and transmits the generated data, indicative of the additional game data back to the matching module 212 of the first user device 10a. As will be appreciated since a plurality of user devices in the subset of peer user devices 10b . . . 10h will provide additional game data, any one device may only generate a portion of the additional game data.

The matching module 212 assesses first set of game data and additional data received from the subset peer devices 10b . . . 10h of the P2P network 12 against a set of predetermined winning conditions. For example, it correlates the additional game data received from the peer devices of the P2P network 12 and the initial game data generated by the input data processing module 208. If the additional game data received from the P2P network 12 and the initial game data generated on the user's device 10a meets certain criteria, for example if the two sets of data matches, then the user wins a game, and if the two sets of data do not match then the user loses the game.

Preferably, the devices that are in data exchange 10a, 10b (i.e. in the same peer group) comprise common data locally stored on each of the user devices that are in the same subnetwork of the overall P2P network, and the overall P2P network may comprise a plurality of such subnetworks which enable a different game to be played on each subnetwork. The data reference block is used to share common data needed by the devices.

The discovery module 222 allows a user device of the P2P network 12 to discover other user devices of the P2P network to thereby establish a network connection.

The linking module 224 manages data communication between peer devices in order to set up and maintain the operation of the P2P network. The data communication generally comprises exchanging message strings, e.g. protocol messages, comprising data representative of node information such as device MAC address, present IP address, device computing resources or the like. In one form, the message strings are communicated between peer devices in a form that is independent of an underlying physical, transport and network layer.

Preferably, the user devices are able to communicate with their peers that are also running the user application through exchange of real-time messages, thereby noting individual device and network states and keeping them stored in their individual device caches. The soft-state instances (comprising each peer identifier, network conditions and the list of peers to reach the destination peer) are maintained and updated through exchange of messages through the software stack. In this way, any device that runs the user application will be able to communicate with its peers regardless of what happens in the underlying physical, transport and network layers.

The software stack 204 enables soft-state network and peer identity storage dynamically throughout the P2P network 12, which enables rapid recovery of ongoing gaming sessions. In case the network connection at a participant's end goes down in the middle of a gaming session, his/her gaming session is automatically continued over the adjacent set of peers as originally discovered by the discovery module.

In a preferred embodiment, a game request, from a first user device, is sent to a subset of the devices of the P2P network. The subset user devices may be selected based on predetermined selection rules such as the time that these devices joined the network, or the time that they exchanged protocol messages with the first user device, or whether the user application is active (i.e. a user is playing a game or viewing advertising content) or idle, or any other criteria.

A preferred embodiment of the game data generation process is described below. In this embodiment, the game data required for a game result to be calculated is generated in two stages: the first stage data generation occurs on a first user device, which is the user device that a user is currently using to play a game, and the game data generated is based on device sensor output; the second stage data generation occurs on one or more peer devices of the P2P network, of which the first user device is also a member node.

Stage 1: Data Gathering from Sensor Output of a First User Device

Figure 3:
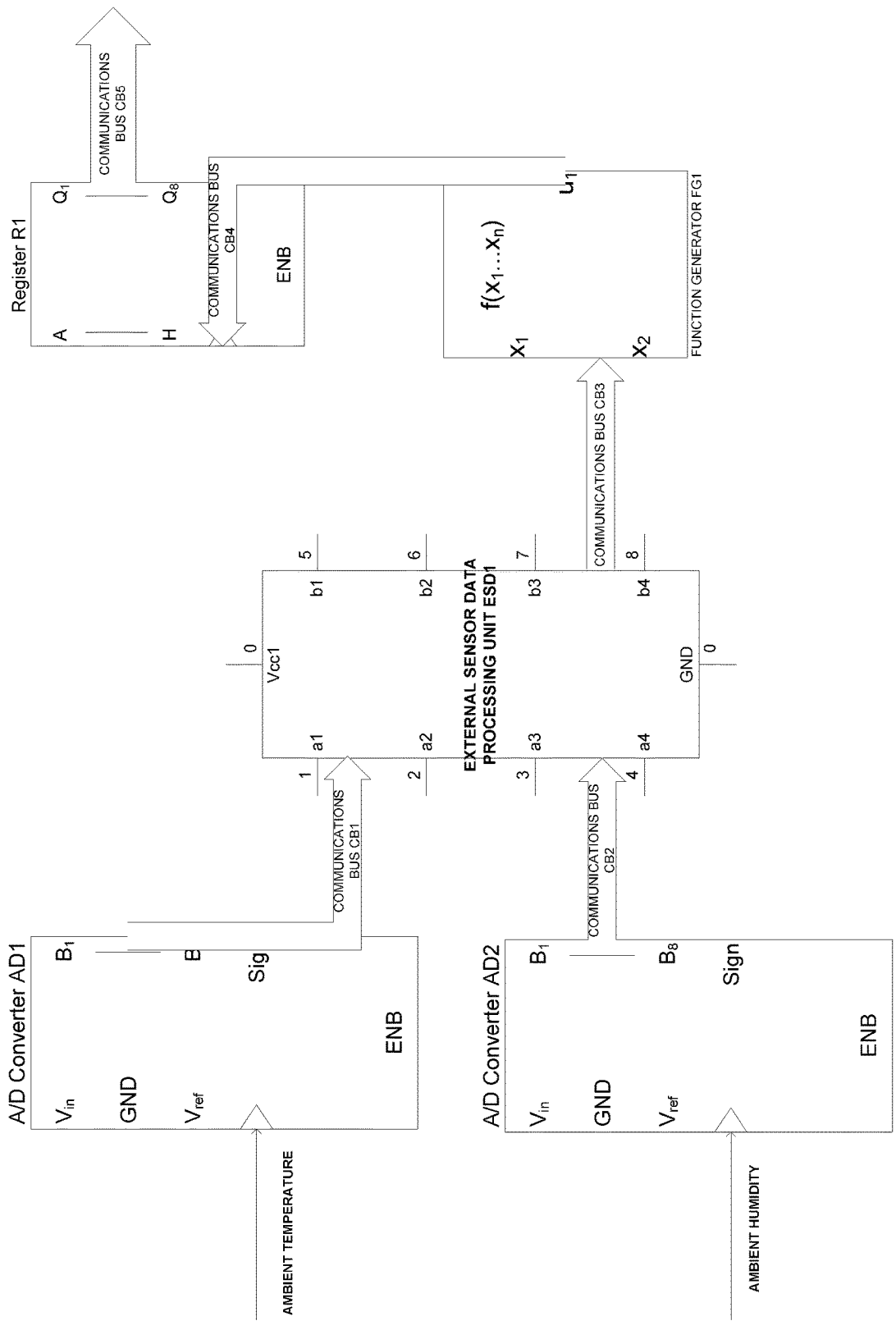
FIG. 3 shows a logical diagram of various sensor components of the user device which may be used by a random number generator module to produce game data required for a game.

FIG. 3 shows a logical diagram of various sensor components of the user device 10a which may be used by the random number generator module 206 to produce a first set of the game data required for a game. In this example, game data is generated based on ambient temperature and humidity. In various other embodiments, game data may be generated based on other ambient and/or device conditions that can be either directly measured or retrieved by sensors of the user devices. In yet another embodiment, the ambient and/or device conditions may be obtained from a third party source for example the internet.

With reference to FIG. 3, AD1 and AD2 are two analog-to-digital converters that can convert measured ambient conditions to digital signals that can be directly used as input of game data generation. As an example, AD1 receives a value representative of ambient temperature and AD2 receives a value representative of ambient humidity and then both output an 8-bit digital signal representative of the measured conditions. In another embodiment, one or more ambient or device conditions may be measured or retrieved by the sensors equipped on the user device.

The 8-bit data output of AD1 and AD2 are then fed into an external sensor data processing unit ESD1 through communication buses CB1 and CB2. In one form, the ESD1 may be an adder which simply performs an addition of the 8-bit data received from AD1 and AD2.

The output of ESD1 is fed into a function generator FG1 through data communication bus CB3. FG1 may be any type of function generator, for example but not limited to a multiplier, a weighted adder or the like. Different weights may be allocated to the 8-bit data output of AD1 and AD2. For example, w1 to the temperature output u1 and w2 to the humidity output u2.

The output of FG1 is fed into a memory unit, or R1 via a similar communication bus.

Figure 4:
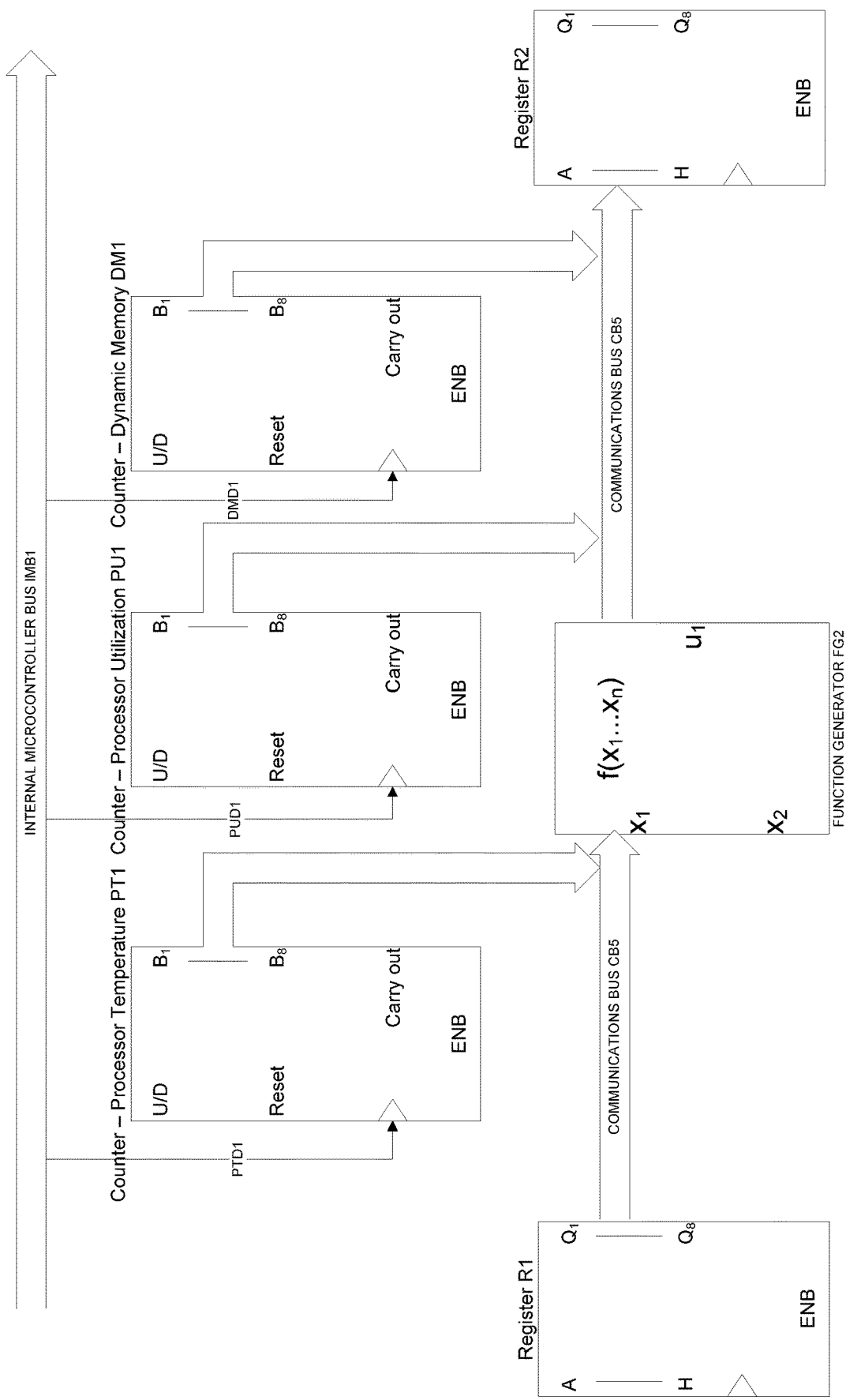
FIG. 4 shows another logical diagram of game data generation utilising various sensor components of a user device.

FIG. 4 shows another logical diagram of game data generation utilising various sensor components of the user device 10a. In this example the game data may be generated at least partially based on device conditions such as CPU (processor) temperature, CPU (processor) utilization, or memory usage. The corresponding sensor data is read at the inputs of three corresponding 8-bit counters shown as PT1, PU1 and DM1 in FIG. 4. The counters may be data registers, adders, multipliers and any other type of data counters. The output of the counters is fed to function unit FG2. Similar to FG1, FG2 assigns weights to measured outputs of CPU temperature (u3), CPU utilization (u4) and dynamic memory usage (u5). The output of FG2 is fed into a memory unit R2. R2 stores the weighted combination of the measured data from various sensors including ambient temperature and humidity, as well as device conditions such as CPU temperature, CPU utilisation and dynamic memory usage. R2 may again be a dynamic memory unit or static storage on the device. The output of R2, i.e. the device sensor output, is what the random number generator module uses to produce the game data.

In one embodiment, the weights w1, w2, w3, w4, w5 may vary with time to generate different combinations of the sensor output data. In another embodiment, the weights may be programmed to vary automatically with different sensor types, and/or based on the game selected by a user. In another embodiment, the weights may be altered, arbitrarily assigned to different types of sensor data based on ambient conditions of the gaming environment, time and/or other factors.

In one embodiment, the user device automatically allocates weights corresponding to the sensor data of interest, as well as chooses the sensor type based on device policy settings. Thus, at any time, for any gaming situation, there is at least a unique combination of output data that is driven from device sensor activities.

In one form, the one or more user device sensors may include one or more of the following sensors: temperature sensor, light sensor, sound sensor, pressure sensor, gesture sensor, accelerometer, gyroscope, magnetometer, proximity sensor, heart rate sensor, fingerprint sensor, UV light sensor, and any other sensor that a user device may be equipped with.

The random number generator 206 module may retrieve data stored in R2 and subject it to further data processing steps. For example, the measured results may be split into a series of single digits 0 to 9. The data may be referenced to a library and stored as graphic elements instead of single digits.

Stage 2: Additional Game Data Generation on the P2P Network

As mentioned above, additional game data is to be generated on a subset of the peer devices of the P2P network after a game request has been received. This step is to be described with reference to FIG. 5, which shows a P2P network including only two user devices, Ui and Uj. Ui is the initiator of a game, or the device that sent a game data request, and Uj is a peer device discovered and connected to Uj via a data communication network and on which additional game data is to be generated.

Figure 5:
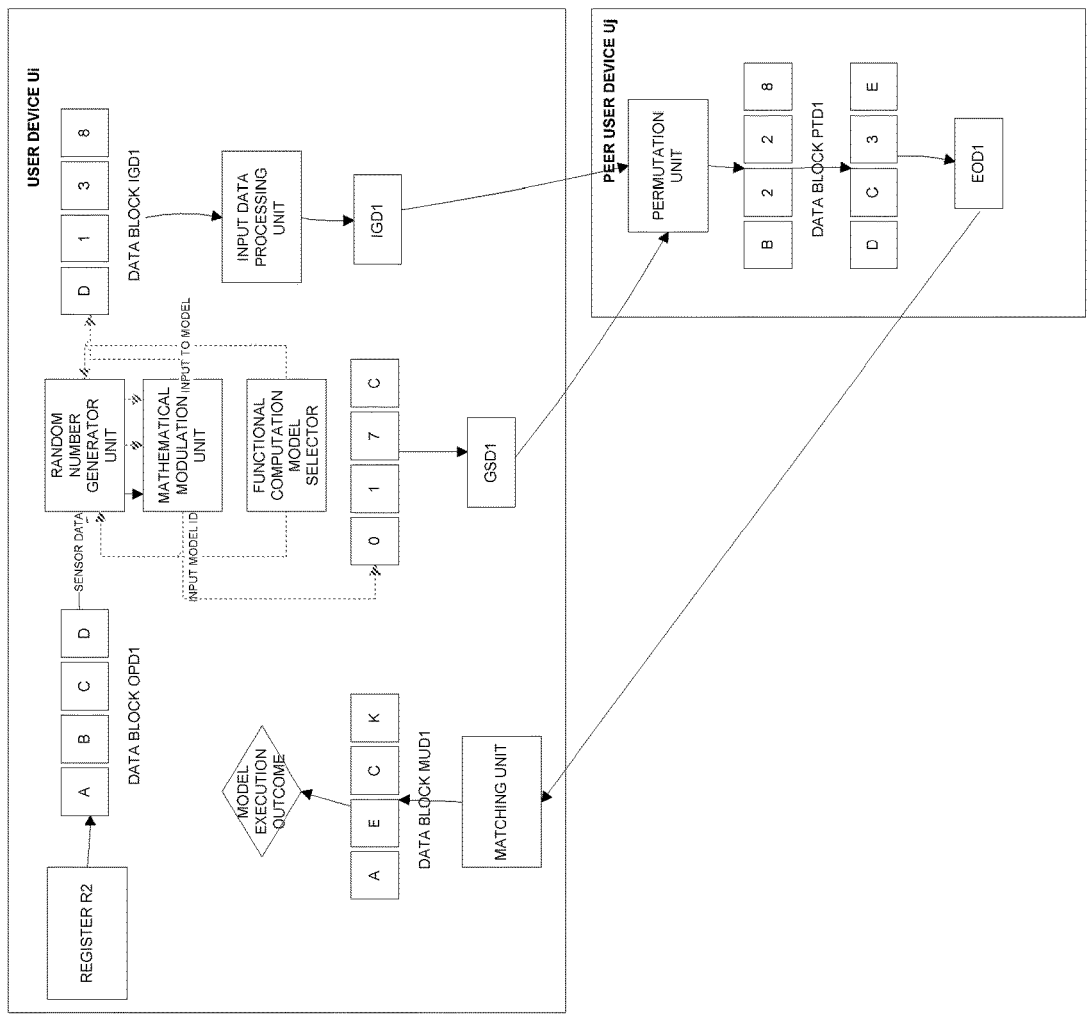
FIG. 5 shows a diagram of a P2P network comprising only two user device.

As described above, the output of R2 is the weighted combination of the external and internal sensor data, shown as data block OPD1 in FIG. 5. In mathematical notation, OPD1:=F1(w1*u1, w2*u2, w3*u3, w4*u4, w5*u5), where F1 can be any function predetermined or chosen by the system. The size of the data block is defined as Ordinal (OPD1). In the example shown, the Ordinality of OPD1 is 4, which means the data block comprises 4 blocks of data.

OPD1 is fed into the random number generator module of Ui. As the random number generator modules receives OPD1, which is an indication that the user is ready to play a game. The game chosen by the user is also invoked, and the game selector module assigns the game strategy to the user, and outputs game strategy data GSD1. In one form, game strategy data comprises a set of binary data generated based on a particular game that the user has chosen to play. The binary data shall ideally be random. (For example, if User X chooses Solitaire to be played on an iPhone, the binary data generated as the game strategy at 9:15 AM (ambient conditions of the user device: CPU temperature 15 degrees C.) could be ABCDEF08, whereas if User X chooses Solitaire to be played again on his iPhone at 9:44 AM (ambient conditions of the user may or may not have changed), the binary data generated is BFC89123.)

By way of example, if a user chooses to play Solitaire, then a set of strings corresponding to the Solitaire game instance would be invoked (for example a string AEFF9810248B, corresponding to the Solitaire game instance that is recognized on the user device Ui). In certain embodiments, the allocated memory may be in static storage area (e.g. BIOS/ROM/firmware). In mathematical notation, GSD1: =G1(g1, g2, . . . , gn), where G1 is a predetermined or system defined data transfer function. In this example, the Ordinality of GSD1 is 4, which means it contains 4 data blocks. In one form, the Ordinality of GSD1 is the same as the length of data generated by the random number generator module.

The random number generator module generates and outputs data block IGD1, which becomes the game data inputted into the game selected by the user of Ui. In mathematical notation, IGD1:=N1(n1, n2, . . . nk), where N1 is a predetermined or system defined function. In this example, the Ordinality of IGD1 is also 4, which means the data contains four data blocks.

Ui discovers peer device through the discovery mechanism of the software stack, and sends a game request including the game data and gaming strategy data information generated on Ui to Uj through the P2P network established after initial discovery, where it is established through the discovery protocol that Ui is the transmitter and Uj must be the corresponding receptor. Data blocks (e.g. game data generated on Ui and game strategy data blocks) are the communicated between devices. This data may be encrypted.

On Uj, the permutation module receives the game request containing IGD1 and GSD1 from Ui, and extracts information about which game the user of Ui has selected to play and the data Ui has inputted to the game. Based on the extracted information, the permutation module generates data block PTD1. In mathematical notation, this could be written as PTD1:=P1(IGD1, GSD1). The ordinality of this data block is the same as that of the functional parametric input data generated on Ui by the random number generator module. The permutation module basically contains a set of combinatorial functions P1, P2, . . . Pn. Each individual combinatorial function Pi is defined and implemented mathematically to work on the inputted values. Any combinatorial function can be implemented but it may implement functions that are generated along with the received game request. Examples of such functions include a combination of recursion, weighted enumeration, bijective methods, exponential generating functions or the like. The permutation module selects a random set of combinatorial functions {Pj} that act on the game request data and produces output data.

The data block PTD1 is encapsulated bit by bit to generate data block EOD1, which is stored on Uj and sent back to Ui, to the matching module. The encapsulated data is processed and data block MUD1 is generated by the matching module. The matching module then assesses received data against a set of predetermined winning conditions. For example it may compare MUD1 with IGD1, if a match is made then the user has won the game. If there is no match, then the user loses the game but can play a new game.

Figure 6:
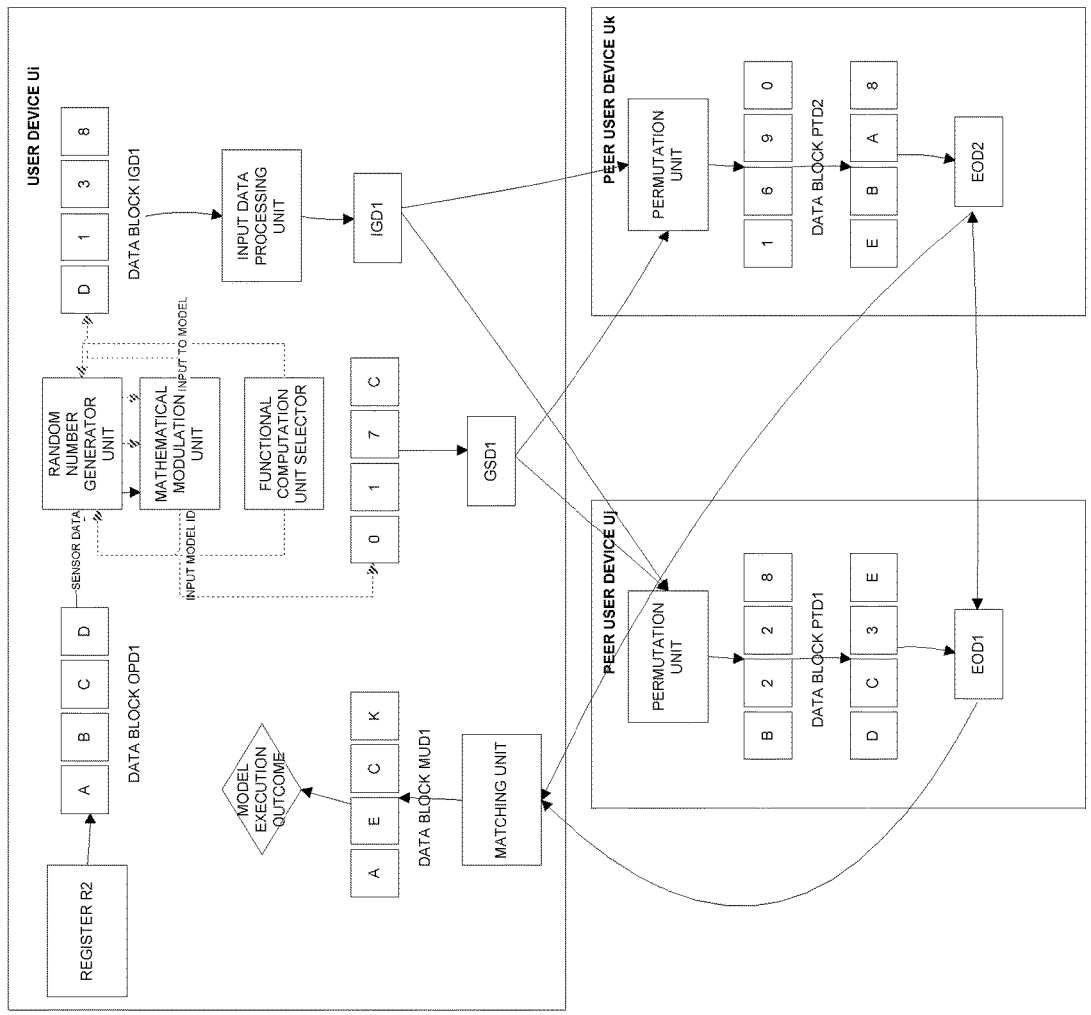
FIG. 6 shows a diagram of a P2P network comprising three user devices.

FIG. 6 shows a diagram of a P2P network comprising three user devices. In the multiple peer device P2P network, Ui as the game initiator still generates initial game input data IGD1, and sends two game requests comprising gaming strategy data and game input data IGD1 and GSD1, to Uj and Uk. The permutation module of each of Uj and Uk receives game requests, and outputs additional game data required as EOD1 and EOD2 respectively. EOD1 and EOD2 are then sent back to the matching module of Ui. The user wins the game if the data outputted by the matching module is the same as his inputted data to the game.

Figure 7:
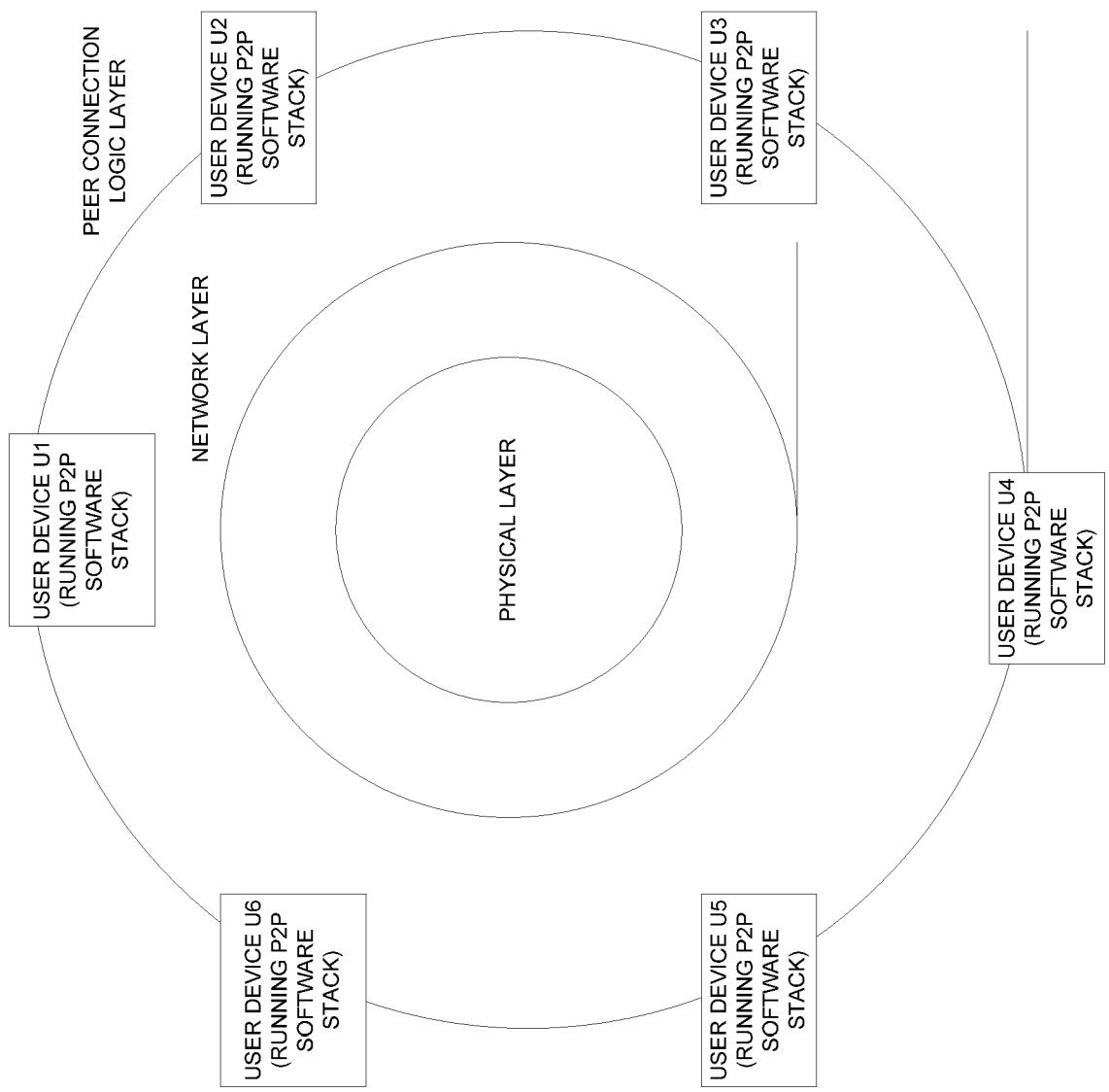
FIG. 7 shows a diagram of a P2P network comprising multiple peer devices.

FIG. 7 shows a P2P network comprising multiple peer devices U1, U2, U3, U4, U5 and U6. The software stack of the user application are connected at the logic layer of an internet communication protocol. The peer connection logic layer is established as a logical network by peers running the native app and the software stack. Once the peers are established, gaming commences. The network is continuously maintained by peer devices exchanging protocol messages in the software stack.

Figure 8:
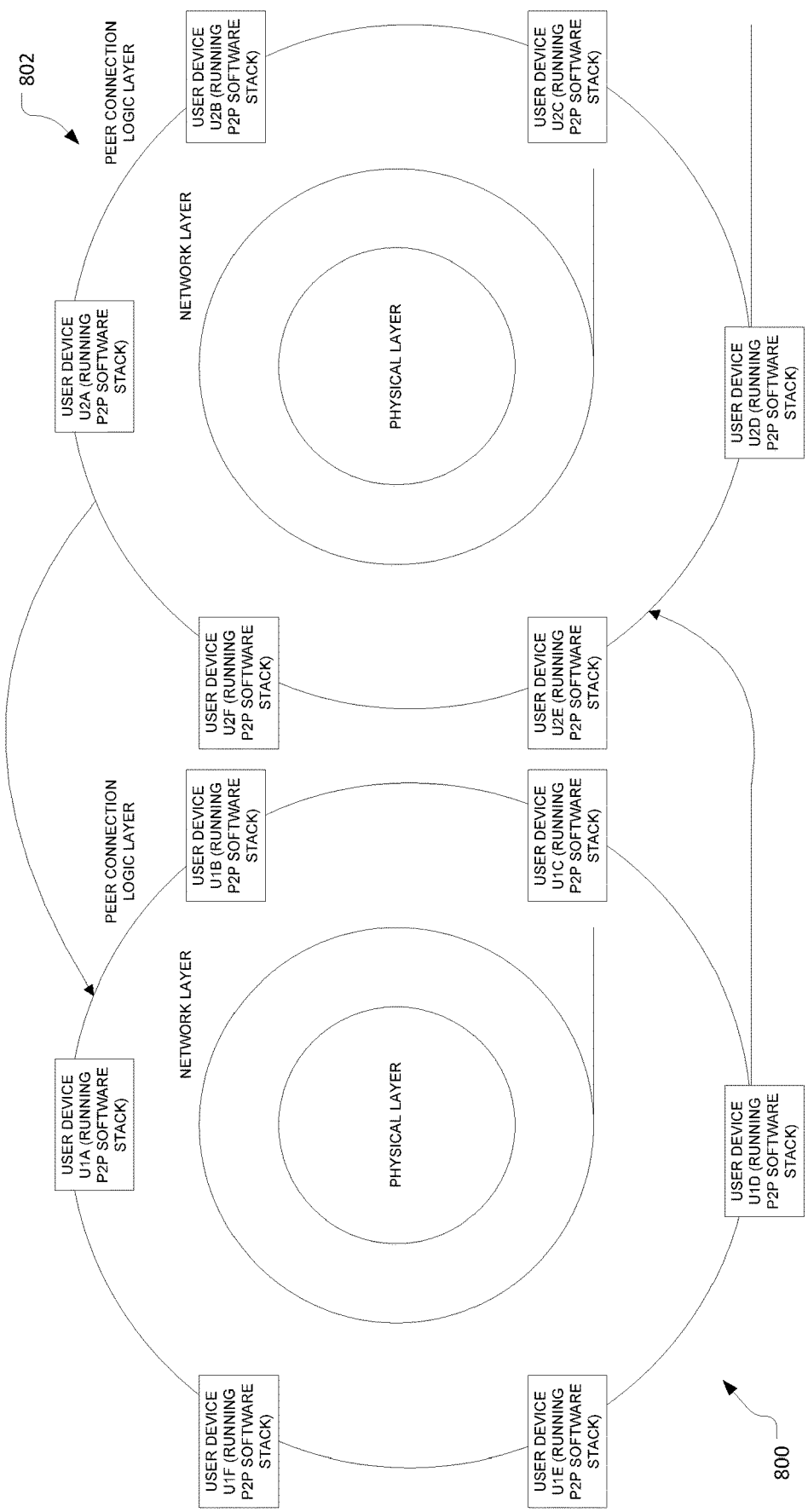
FIG. 8 shows a further extension of the P2P network comprising multiple peer groups.

FIG. 8 shows a further extension of how the network, and the peer-group, becomes rapidly scalable, attracting more people playing the same game and creating a plurality of peer user groups. In FIG. 8, rather than increasing the complexity and size of the peer group as new devices enter the network, new peer groups are created. In this example two distinct peer groups have formed, one 800, comprising user devices U1A, U1B, U1C, U1D, U1E and U1F, and the other 802 comprising device U2A, U2B, U2C, U2D, U2E and U2F. Devices can leave each network, or swap between them as needed.

FIG. 9 shows a set of user scenarios for deploying one or more of the embodiments of this disclosure.

FIG. 9 (a) shows two end user devices, Device A and Device B, connected as a physical network pair. Device A initiates a peer discovery P2P protocol message to Device B. Device B successfully recognizes Device A as its physical peer and it extracts the received P2P game request, parses and reads the message fields and executes the gaming strategy instructions on itself. Likewise, once the peer link is established, any user initiating a game on Device B will have the gaming strategy instructions executed on Device A.

FIG. 9 (b) shows three end user devices, Device A, Device B and Device C. A peer discovery mechanism is initiated by Device A for Device C by sending a peer discovery P2P protocol message from Device A to Device C via Device B. Device C successfully recognizes Device A as its logical peer and it extracts the received P2P protocol message, parses and reads the message fields and executes the gaming strategy. Likewise, once the peer link is established, any user initiating a game on Device C will have the gaming strategy instructions executed on Device A. Further, Device B sends a peer discovery P2P protocol message from it to Device C, and the peer link is established between Device B and Device C. For a user selecting a game on Device A, a game request will be sent to by both Device B and Device C which will execute the gaming strategy collaboratively on both Device B and Device C. Should Device B decide to leave the peer group, Device A and Device C can still keep on playing and retain the original gaming session. Should the physical/transport/network layer link between Device A and Device B fail while all the devices are participating in a particular gaming session, that gaming session continues between Device B and Device C.

FIG. 9 (c) shows 5 end user devices, Device A, Device B, Device C, Device D and Device E. An instruction set involving a set/unset of the L field in the P2P protocol messages sets Device A and Device E to be part of a logical peer network L1, Device C and Device D to be part of a second logical peer network L2. Device B is part of a separate logical peer network L3. By shutting off Device B in logical peer network L3 through an unset of the L bit in the discovery P2P protocol message between Device B and Device A, and through a set of the L bit in the peer discovery P2P protocol message between Device A and Device C and Device D, Device A can be included as a logical peer in the logical peer network L2 comprising Device C and Device D. This is an embodiment of how syndicated gaming happens when an external participant joins an existing gaming group.

Advantages

As can be seen from the foregoing description certain embodiments of the present disclosure can provide a software platform having one or more of the following advantages. The platform can provide a gaming platform which is reliable and which remains functional at all times with the same Quality of Service (QoS) levels. The system functions independently of the condition of its underlying physical, transport and network layers. As each player receives game data from peer devices instead of from a central server, the system is highly scalable and highly resilient in the event of failure of components in the network. The system automatically discovers new participant users and forms dynamic P2P networks within user groups to support the gaming sessions and may restore ongoing networking and communications sessions after a network blackout. It enables a user to participate the game on any portable electronic user devices such as mobile phones, tablet devices, laptops, PDAs, computers and similar thereof with minimum requirement on the underlying internet speed. Moreover the platform can be relatively straightforward to implement and require minimal ongoing intervention Advertising Content In some embodiments, the advertisers i.e. those entities, companies, brands of the like, can provide game prizes for awarding to players who play in games using the system, and optionally who win a game. The prizes awarded may be in the form of goods or services, points redeemable for goods and services (e.g. loyalty points) or monetary awards. In this way a player may be eligible to play games and win a prize without paying an entry fee or making a wager.

In one form, the user application displays advertising content at various stages of a game playing process, e.g. before, during, or after a game. In addition, the advertising content may be automatically updated as the user navigates to different interfaces of the user application, as the user switches to a different game, or each time as the user application is initiated. The central server may transmit advertising content to the user application at regular intervals, or as the server receives a request from the user application for such advertising content. In some embodiments, the server may have a mechanism to customize advertising content based on characteristics and/or behaviour of each user, e.g. age, geographical location, frequency of using the user application, past game results, and so on.

The advertising content may be displayed as banners, pop-up screens, images, or in any other suitable format. In one form, the advertising content may be dynamically linked to one or more additional advertising pages. For example, after a user clicks on a banner, the user application may retrieve additional information from the central server in regards to that banner, and display the additional information to the user. The central server may keep track of such user interaction with the advertising content, e.g. frequency of exploring advertising content, time spent on viewing these information, types of advertising information that interest the user the most, or the like, and only transmit content that the user is likely to be interested in.

Modifying the Winning Probability of a Game of Chance

In some embodiments the player may nominate the prize that they are playing for. In such embodiments the value of the prize nominated can influence how the game is operated, and in particular the game strategy applied.

For example, a player may choose to play roulette and they nominate a prize of $10 for a "Red or Black" bet. Under the rules of a base game of roulette, to win $10 on a Red or Black bet the player must stake $5, and the apparent odds of winning are 18/37 (assuming a single zero is employed in the base roulette game). However, according to a present embodiment, if the player completes an advertising survey associated with the game, a service which is considered to have a value of $6. The game is played at modified odds to account for the fact that the value of the player's stake is greater than that necessary, so their odds of winning is improved. In a preferred embodiment the modified base game has an modified probability for the "Red or Black" bet of 108/185 (determined by multiplying the apparent probability (18/37) by the ratio of the players stake to the stake corresponding to the desired prize (6/5). In this example the player's chance of winning goes from being just under 50% to over 50%.

In another example, if the player interacts with a lower value advertising content (e.g. views a short advertisement) the value of the interaction may be a fraction of the stake. For example viewing an advertisement may be worth $0.05, in which case the modified probability of succeeding in the "Red or Black" will become 18/3700.

Mathematically, modifying the operation of the game to have the modified odds is relatively easy, by determining the outcome of the game in two stages, where one stage represents the base game and another stage determines the modifier. The order is not important. As will be appreciated, as with most electronic gaming scenarios, the representation of the game that is presented to the player (e.g. shown on the screen) is a visual simulation of the game generated after the result of the game has been determined, so the variable odds may not be apparent to the player. Alternatively the modified game could be displayed—e.g. an virtual expanded roulette wheel with 3700 numbers, but having only 18 Red numbers (assuming that the player selects picks Red), may be shown, to illustrate the modified odds of their game.

General

Embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. One or more of the components and functions illustrated the figures may be rearranged and/or combined into a single component or embodied in several components without departing from the disclosure. Additional elements or components may also be added without departing from the disclosure. Additionally, the features described herein may be implemented in software, hardware, as a business method, and/or combination thereof.

In its various aspects, the disclosure can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of providing a game over a peer to peer (P2P) game network, wherein the P2P game network comprises a plurality of user devices as nodes of the network, said P2P game network performing a method comprising:

before receiving a game request from a first user device of the P2P game network to play a game, generating a first set of game data on the first user device based on one or more sensor outputs of one or more sensors of the first user device; and generating or processing the first set of game data on a subset of the plurality of user devices of the game network, in response to the first user device, not being a member of the subset of the plurality of user devices, generating the game request to play the game.

2. The method of claim 1 comprising the steps of:
receiving the game request from the first user device of the P2P game network, processing the game request received to decide game data required by the game request,
providing the required game data to the first user device that sent the game request.

3. The method of claim 2 wherein the step of receiving the game request comprises:
receiving the game request on a subset user devices of the P2P game network, wherein the subset user devices do not include the first user device that sent the game request.

4. The method of claim 1 wherein, the first user device and the subset of the plurality of user devices form a subnetwork of the P2P game network, wherein the subnetwork is also a P2P network.

5. The method of claim 4 wherein data exchange between the subset user devices of the subnetwork is in the form of protocol messages.

6. The method of claim 1 wherein, the step of generating the first set of game data on the first user device comprises:
retrieving or reading an output of the one or more sensors of the first user device,
wherein the one or more sensor outputs are in a data format suitable for the game selected by the first user device.

7. The method of claim 1 wherein, the game request comprises data indicative of the first set of game data generated on the first user device.

8. The method of claim 7 wherein, the game request further comprises data indicative of the game chosen by the first user device.

9. The method of claim 1 wherein, the method further comprises:
encapsulating the game request before sending it to the subset of the plurality of user devices of the P2P game network.

10. The method of claim 1 wherein, the step of generating the the first set of game data comprises:
analyzing the game request received to determine the first set of game data already generated by the first user device and a second set of game data required for completion of the game, and
generating the second set of game data required on the P2P network based on the game request.

11. The method of claim 10 wherein, the step of generating the second set of game data on the P2P network comprises:
based on the game request, performing a series of combinatorial functions on the first set of game data.

12. The method of claim 10 wherein the method further comprises:
encrypting the second set of game data generated by the subset of the plurality of devices, and decrypting the second set of game data on the first user device upon receiving the second set of game data from the subset of the plurality of devices.

13. The method of claim 10 wherein, the method further comprises:
after receiving the requested second set of game data on the first user device,
assessing the second set of game data against a set of winning conditions,
determining a game result of the game,
displaying the game result to a user on a display of the first user device.

14. The method of claim 13 wherein the game result is associated with a prize.

15. The method of claim 10 wherein, the method includes:
providing the first and the second set of game data to a server,
assessing the first game data and the second game data against a set of winning conditions on the server,
determining a game result, and
providing the game result to the first user device that the game.

16. The method of claim 15 wherein, the set of winning conditions include a lookup table of predefined sequences of game elements such as digits or numbers, graphic elements, icons, and words.

17. The method of claim 15 wherein, the step of assessing the first game data and the second game data against the set of winning conditions includes:
comparing the first game data and the second game data, and the winning condition is determined based on a correlation or similarity of the first game data and the second game data.

18. The method of claim 15 wherein the server is a remotely located cloud server.

19. The method of claim 1 wherein, the one or more sensors include one or more of the following sensors: temperature sensor, light sensor, sound sensor, pressure sensor, gesture sensor, accelerometer, gyroscope, magnetometer, proximity sensor, heart rate sensor, fingerprint sensor, or UV light sensor.

20. The method of claim 19 wherein, the one or more sensors include a temperature sensor for measuring ambient temperature, or measuring temperatures of various hardware components including a CPU, GPU, hard drive or motherboard of the first user device.

21. The method of claim 1 wherein after retrieving or reading an output of the one or more sensors of the first user device, the method further comprises:
splitting a numerical value of the one or more sensor output to a series of single digits 0 to 9;
combining or arranging one or more of the single digits of the numerical value to form numbers that have a predefined length; and
referencing the numerical value of the output or one or more single digits of the numerical value against a reference library to convert the numerical value to one or more graphic elements.

22. A programmable user device having a processor or processors that are configured to execute computer-readable instructions to execute a method as claimed in claim 1.

23. The programmable user device of claim 22 which further comprises:
input means for enabling a user to play a game,
a communication module that is operable to form a data communication link with the plurality of user devices of the P2P game network,
a central processing unit for processing game data,
a user display for displaying relevant game information to the user.

24. The programmable user device of claim 22 wherein said device comprises any one of: a smartphone, tablet, tablet computer, laptop, PDA, or other portable electronic device.

25. A computer-readable medium having stored thereon computer executable instructions that, when executed on a processing device or devices, cause the processing device to perform the method of claim 1.

26. A method of playing a game on a first user device, the method comprising the steps of:
before receiving a game request from a first user device of a peer to peer (P2P) game network, generating a first set of game data on the first user device based on one or more sensor outputs of one or more sensors of the first user device;
generating the game request on the first user device, wherein the game request is indicative of a request for game data,
providing the game request to a game network, wherein the first user device is part of the game network, said game network comprises a plurality of user devices,
generating or processing the first set of game data on the plurality of user devices of the game network responsive to the game request;
receiving requested game data on the first user device.

27. The method of claim 26 wherein the plurality of user devices are nodes of the P2P network.

28. The method of claim 26 wherein the step of providing the game request to the game network comprises:
providing the game request to a subset of the plurality of user devices of the game network, wherein the subset of the plurality of user devices are selected from the game network based on a set of predetermined rules, and the first user device and the subset of the plurality of user devices form a subnetwork of the P2P game network during game play.

29. The method of claim 28 wherein, the subnetwork is established and maintained by exchanging protocol messages between the subset of the plurality of user devices of the subnetwork.

30. The method of claim 26 wherein, the game request is indicative of a type of game selected by a user and the data required from the game network for completion of the game.

31. The method of claim 26 wherein the P2P network is any one of structured network, a predefined network, a hybrid P2P network or unstructured network.

32. The method of claim 26 wherein, the method further comprises:
after receiving the requested game data by the first user device,
assessing the game data against a set of winning conditions,
determining a game result of the game,
displaying the game result to a user on a display of the first user device.

33. The method of claim 26 wherein, the method further comprises:
transmitting the game data to a server,
assessing the game data against a set of winning conditions on the server,
receiving and displaying a game result on the first user device.

34. The method of claim 33 wherein, the set of winning conditions includes a lookup table of predefined sequences of game elements such as digits or numbers, graphic elements, icons, words and similar thereof.

35. The method of claim 33 wherein the game result is associated with a prize.

36. The method of claim 33 wherein, the server is a remotely located cloud server.

37. A method of providing a game over a peer to peer (P2P) game network, wherein the P2P game network comprises a plurality of user devices as nodes of the network, said P2P game network performing a method comprising:
- generating game data required by the plurality of user devices of the P2P game network to play a game, wherein generating the game data comprises:
  - analyzing a game request received to determine a first set of game data already generated by a first user device from the plurality of us devices and a second set of game data required for completion of the game, and
  - wherein the second set of game data required on the P2P network is generated based on the game request by performing a series of combinatorial functions on the first set of game data based on the game request.

38. A method of playing a game on a first user device, the user device being a node of a P2P game network comprising a plurality of user devices, the method comprising:
- on the first user device:
- before receiving a game request on the first user device of the P2P game network to play a game, generating a first set of game data on the first user device based on one or more sensor outputs of one or more sensors of the first user device; and
- generating the game request, wherein the game request comprises a request for game data,
- providing the game request to a subset of the plurality of user devices of the P2P game network,
- on the game network:
- receiving the game request,
- processing the game request received to decide additional game data required by the game request,
- generating or processing the first set of game data on a subset of the plurality of user devices, and
- providing the game data to the user device that the game data and/or to a server,
- on the first user device,
- generating and displaying a game result.

* * * * *

UNITED STATES PATENT AND TRADEMARK OFFICE
CERTIFICATE OF CORRECTION

PATENT NO. : 10,894,209 B2
APPLICATION NO. : 16/306633
DATED : January 19, 2021
INVENTOR(S) : Lloyd et al.

It is certified that error appears in the above-identified patent and that said Letters Patent is hereby corrected as shown below:

In the Claims

In Column 18, in Claim 10, Line 52, delete "the the first" and insert -- the first --, therefor.

In Column 19, in Claim 15, Line 21, after "device that" insert -- requested --.

In Column 21, in Claim 37, Line 17, delete "of us" and insert -- of user --, therefor.

In Column 22, in Claim 38, Line 19, after "device that" insert -- requested --.

Signed and Sealed this
Eighth Day of June, 2021

Drew Hirshfeld
*Performing the Functions and Duties of the
Under Secretary of Commerce for Intellectual Property and
Director of the United States Patent and Trademark Office*